Nov. 29, 1960  A. L. THURSTON  2,962,276
PORTABLE VEHICLE WEIGHING APPARATUS
Filed July 31, 1957  4 Sheets-Sheet 1
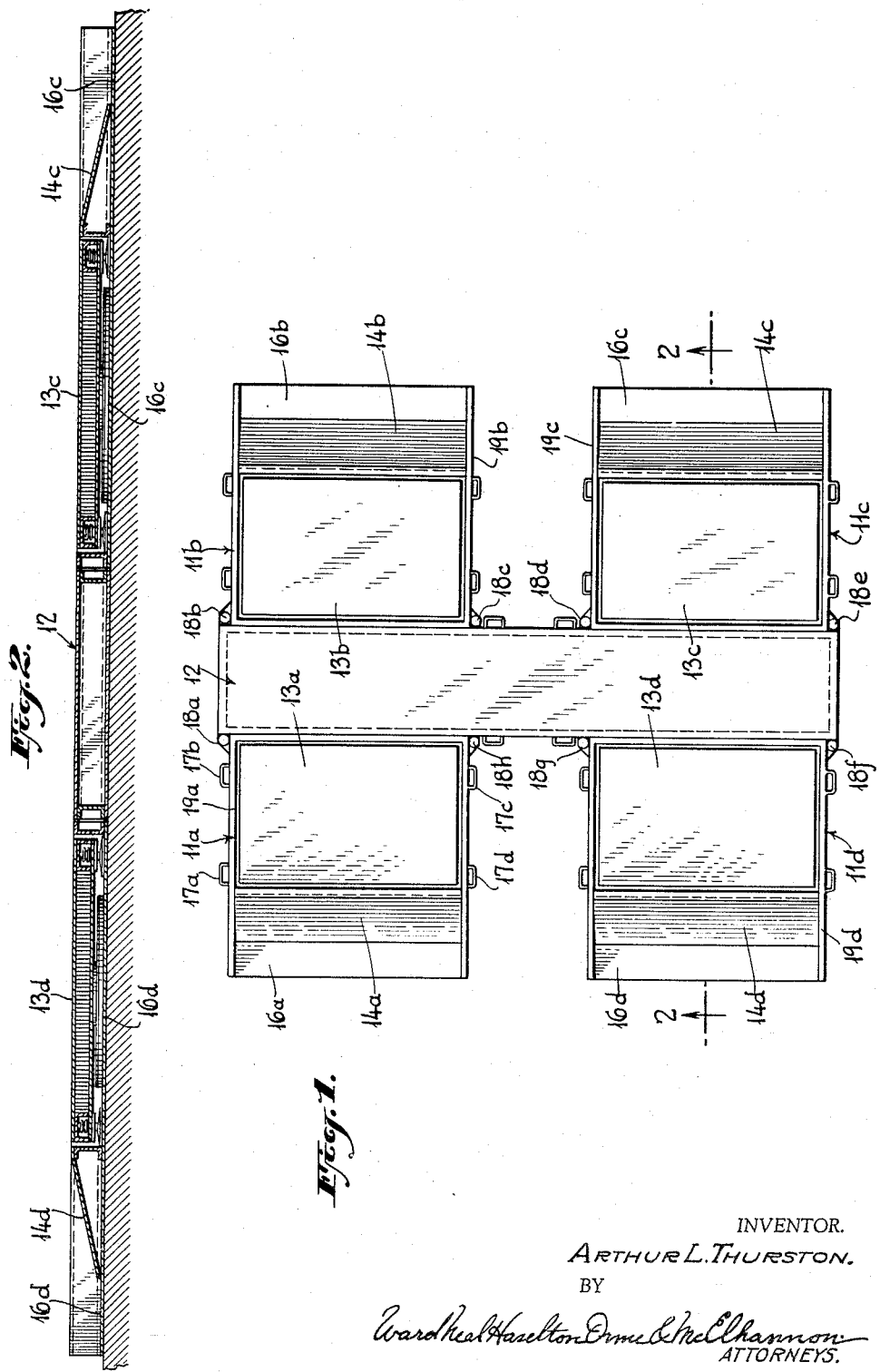
INVENTOR.
ARTHUR L. THURSTON.
BY
Ward Neal Haselton Orme & McElhannon
ATTORNEYS.

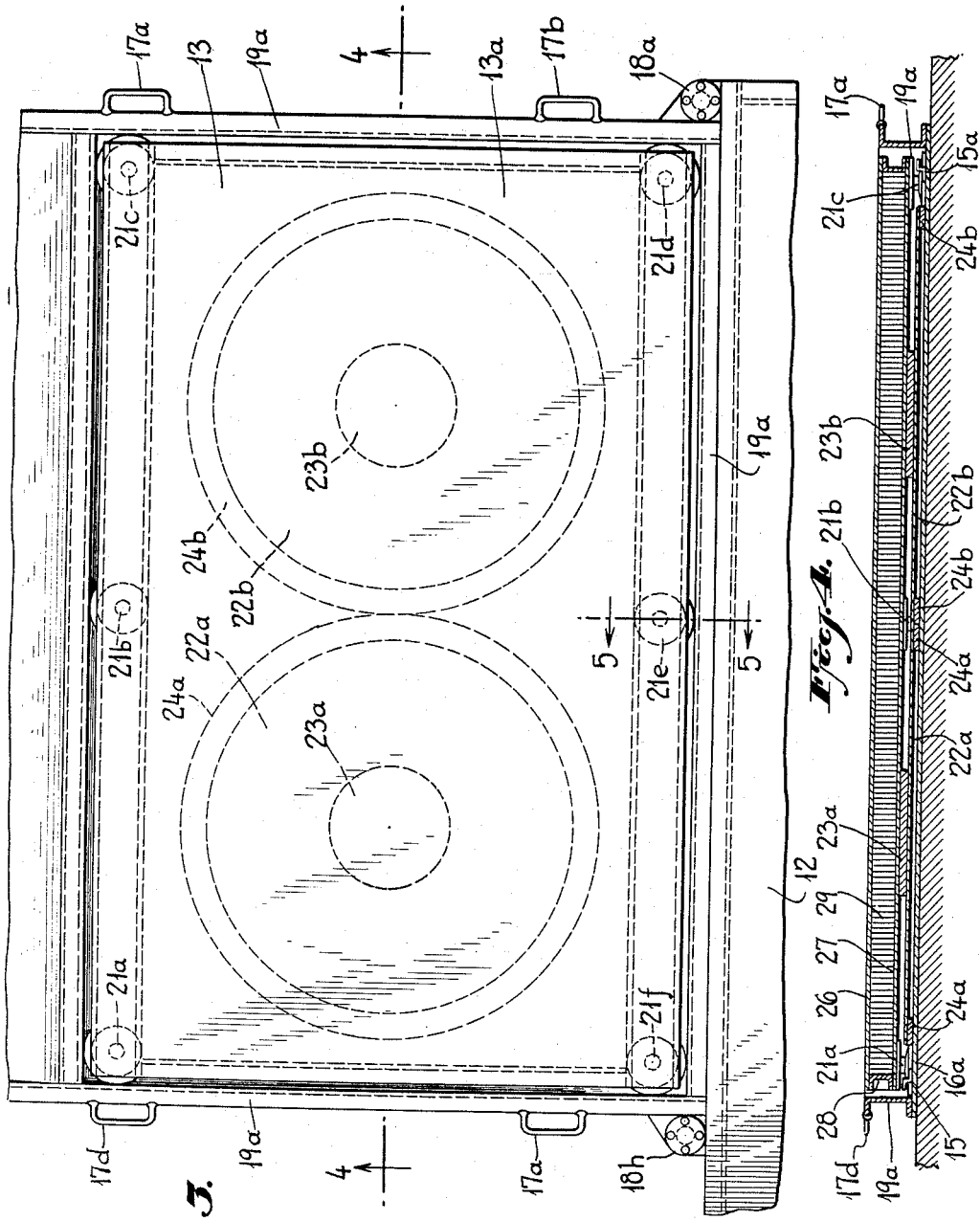

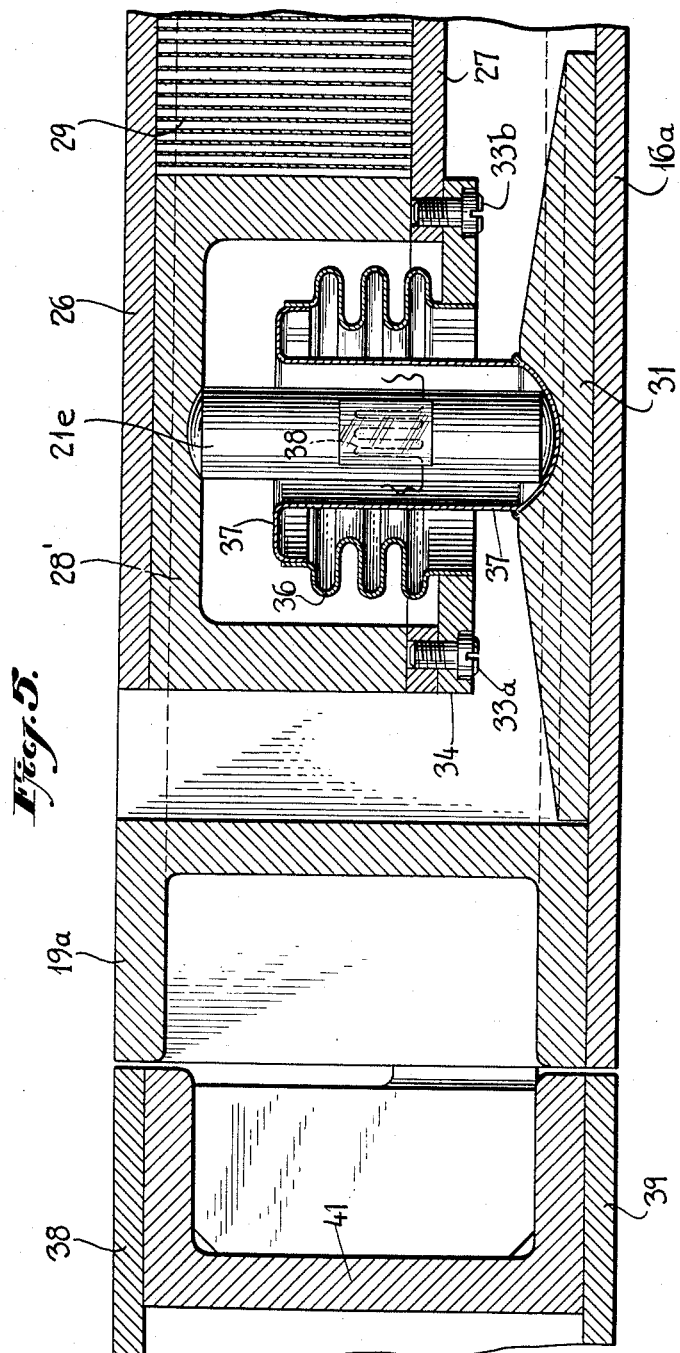

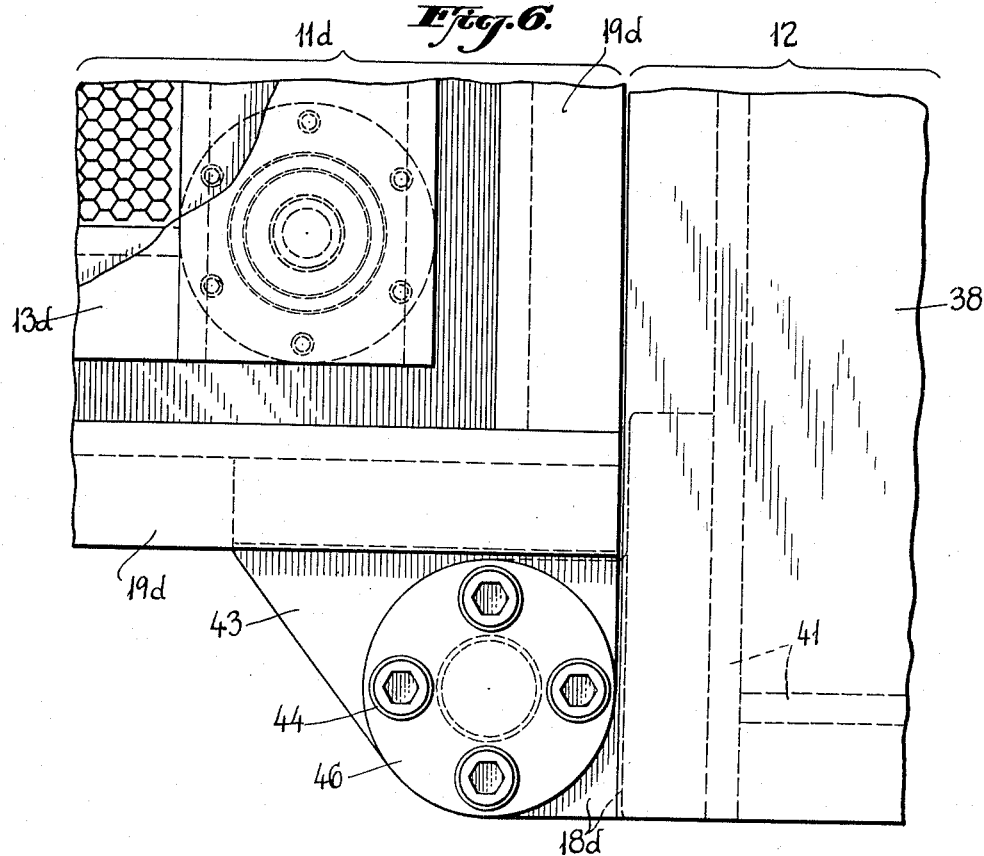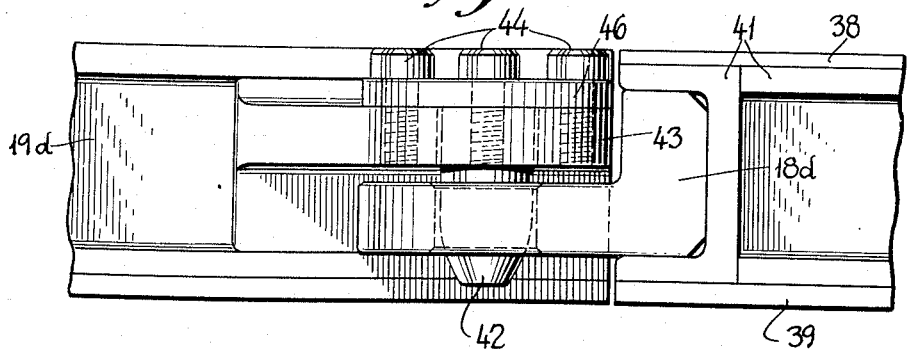

United States Patent Office 2,962,276
Patented Nov. 29, 1960

2,962,276

PORTABLE VEHICLE WEIGHING APPARATUS

Arthur L. Thurston, Cheshire, Conn., assignor to Revere Corporation of America, Wallingford, Conn., a corporation of New Jersey Filed July 31, 1957, Ser. No. 675,438

9 Claims. (Cl. 265—71)

This invention relates to apparatus for measuring compression forces and is particularly adaptable to vehicle weighing apparatus among other possible uses.

In one of its presently preferred forms the invention may be embodied in platform scales designed for weighing trucks, cars, airplanes, etc. This invention is especially useful in the design of light-weight portable scales.

There is great demand for portable apparatus capable of weighing cars, trucks, airplanes, etc. without the use of expensive or heavy equipment. The need for suitable devices for weighing trucks is particularly acute. In order to prevent damage to highways, the governments of various jurisdictions have enacted laws which limit the weight or load allowable upon axles of vehicles such as trucks, semi-trailers, trailers and the like within their respective jurisdictions. Proper enforcement of such laws requires maintaining vehicle or truck weighing stations at selected locations on highways. Such inspection or weighing stations may usually be located upon an auxiliary lane which is parallel to the main highway and in which a platform scale or scales are placed. Due to the size and weight of previously available apparatus, truck weighing stations in current use generally are of the permanent type. Various suggestions have heretofore been made for the provision of some simple, accurate and relatively inexpensive portable apparatus for weighing trucks, cars, etc. so as to avoid the use of the commonly available types of large, heavy, expensive and generally non-portable mechanical scales. Various hydraulic devices have been proposed, but such equipment has usually been found excessively bulky, cumbersome or inaccurate.

According to one aspect of this invention, apparatus for measuring compression forces may be provided which comprises two members closely spaced in substantially parallel superposed relationship with stress-receiving means interposed between said members, means being provided for determining the strain in the stress-receiving means. To retain said members in assembled relation means such as a flexible diaphragm is located between them and substantially parallel thereto, such diaphragm being secured at its periphery to one of the members and at a point remote from its periphery to the other. Pluralities of flexible strips or the like suitably secured to the two members might also be used for securing same together.

The preferred stress-receiving means comprises a plurality of especially formed compact weighing cells comprising steel columns spaced between the members so that a compression force, such as a part of the weight of a truck, applied to one of the members is transmitted to the columns. The strain produced in the columns as a result of the force applied to the member can then be measured by means of electrical resistance type strain gages mounted on the columns at positions intermediate the members. The other member acts as a support to resist the force applied to the first member and transmitted to the columns.

In one embodiment, this invention is used in portable weighing scales especially adapted for use on highways and which comprise a plurality of individual weighing platforms acting in cooperation with ramp portions and a center section to provide a convenient light-weight apparatus which is readily transportable and which can be easily assembled and put in place for use by one or two persons. In this embodiment, the parallel members are preferably positioned substantially horizontally and close together to provide an assembly which is very low in weight and shallow, and thus affording easy movement of trucks and the like onto and from same, without requiring the usual permanent pits ordinarily necessary for platform scales. The means for securing the members together, such as a diaphragm which is located between the two parallel members in accordance with this invention is preferably a relatively thin, flexible sheet of metal, such as steel or aluminum. By fastening the diaphragm at its periphery to one of the parallel members and at or near its center to the other member, it is possible to obtain a compact arrangement of small height and such that horizontal movement of the two members with respect to each other is prevented while vertical movement is unimpeded due to the flexibility of the diaphragm or its equivalent. The use of this arrangement in weighing apparatus as described above enables the scales to be so constructed that any weight placed upon the top member is transmitted to the columns or weighing cells interposed between the two members without allowing any substantial horizontal movement of the top member.

In accordance with the invention, an especially compact weighing cell construction having a small vertical overall dimension is also provided in a convenient form for easy assembly with the other parts.

Various further and more specific objects, features and advantages of this invention will appear from the description taken in connection with the accompanying drawings which form a part of this specification and illustrate by way of example one embodiment of this invention. The invention consists in such novel features and combinations of parts as may be shown and described in connection with the apparatus herein disclosed.

In the drawings, Fig. 1 is a plan view showing a portable truck weighing apparatus embodying the invention in a form especially adapted for use on highways;

Fig. 2 is a vertical sectional view taken substantially along line 2—2 of Fig. 1;

Fig. 3 is a plan view showing one of the weighing assemblies in greater detail than is shown in Fig. 1;

Fig. 4 is a vertical sectional view taken substantially along line 4—4 of Fig. 3;

Fig. 5 is a vertical sectional view taken substantially along line 5—5 of Fig. 3;

Fig. 6 is a plan view showing in more detail the means for detachably securing together the portable weighing apparatus shown in Fig. 1; and Fig. 7 is an elevational view of the portions shown in Fig. 6.

Referring to the drawings in further detail, the apparatus shown is a portable truck weighing scale comprising four weighing assemblies 11a, 11b, 11c and 11d and a center section 12 so arranged that either single or tandem truck axles can be weighed. The four weighing assemblies and the center section preferably are of light weight, for example about 125 pounds each or less, in order to facilitate rapid assembly by one or two persons. The weighing assemblies comprise weighing platforms 13a, 13b, 13c and 13d, ramps 14a, 14b, 14c and 14d, base plates 16a, 16b, 16c and 16d and frames 19a, 19b, 19c and 19d. The weighing assemblies and center section are provided with handles such as 17a, 17b, 17c and 17d so that each unit can be lifted and positioned easily. Center section 12 is provided with lugs 18a to 18h, inclusive, adapted to receive pins carried on the weighing assemblies as hereinafter described (see Figs. 6 and 7). By means of these connections the weighing assemblies and center section can be assembled into a portable truck scale with a minimum of time and effort, and later taken apart and moved to some other location if desired.

In the operation of this apparatus, a vehicle may be positioned so that the axle or tandem axle assembly to be weighed is positioned with its wheels on the appropriate weighing platforms. For weighing single axles either weighing platforms 13a and 13d or 13b and 13c may be used while all four are used for weighing tandem axle assemblies. In this respect, ramps 14a, 14b, 14c and 14d provide means for moving the wheels of the axle onto and off of the weighing platforms while center section 12 which is coplanar with the weighing platforms provides the necessary means for crossing between opposed platforms, e.g., 13d and 13c. In addition, center section 12 serves to space platforms 13a and 13b at the proper distance from platforms 13d and 13c.

In Figs. 3 and 4 it can be seen that weighing cells or devices such as 21a to 21f, inclusive, are interposed between platform 13a and base plate 16a. These essentially comprise steel columns carrying electrical resistance type strain gates bonded thereto in order to measure the strains resulting in the columns as a result of weight applied to the platform (see Fig. 5). Columns 21a to 21f, inclusive, are so positioned that any weight applied to platform 13a is transmitted to the columns.

Horizontal movement of the platforms is substantially prevented by means of diaphragms as at 22a and 22b which are preferably thin, flexible sheets of metal. Diaphragm 22a, for example, may be fastened to platform 13a through the medium of a disc 23a, and to base plate 16a by a ring 24a, while diaphragm 22b is secured in a similar manner. Discs 23a and 23b may be of any suitable construction. For instance, they might be solid steel discs which are welded in place or they might comprise plastic discs which are bonded in place or rigid elements welded or bolted to the weighing platform on one side and to the diaphragm on the other side. Whatever the construction of discs 23a and 23b and rings 24a and 24b, it is important that they have sufficient thickness so that the diaphragms do not come into contact with either platform 13a or base plate 16a when loads are applied to the platform. If desired, discs 23a and 23b and rings 24a and 24b might be replaced by other suitable fastening means capable of maintaining the center and peripheral portions of the diaphragms in the proper position. It is, of course, immaterial whether the discs and rings are positioned as shown in Fig. 4 or are reversed, that is, with the discs being fastened to the base plate and the rings being fastened to the platform. From Fig. 4 it can be seen that the diaphragms prevent horizontal movement of platform 13a without providing any substantial resistance to the limited vertical movement associated with transmitting the stress caused by a weight to the weighing columns. Excessive downward movement of platform 13a may be prevented by stops 15 and 15a which are fixed to base plate 16a as shown in Fig. 4. These stops can, for example, support the weighing platform when the weighing columns have been removed and will also minimize danger of damage to the weighing cells when excessive overloads are applied to the weighing platform. In normal use the platform 13a does not, of course, contact stops 15 and 15a.

The weighing platforms, such as 13a, are preferably of sandwich-like construction in order to reduce the weight of the assembly. As shown in Fig. 4, platform 13a comprises a top plate 26, bottom plate 27, a frame 28 and an interior section 29. The top and bottom plates are preferably aluminum plates while the interior is of honey-comb or like construction in order to save weight. Light weight materials, such as aluminum or balsa wood, can be used successfully in this type of construction. Any suitable construction can be used for platform 13a provided the platform is capable of receiving heavy weights without substantial deformation or flexing.

Fig. 5 shows a preferred method of positioning a weighing column, such as 21e, so that it will receive the loads applied to the upper surface of platform 13a. Column 21e is supported at its lower end by a base element 31 which is fixed to base plate 16a. Weight applied to top plate 26 of the platform structure is transmitted to column 21e by a frame or beam portion 28'. Beam portion 28' is of channel shape with its channel facing down. Beam portion 28' is secured at its upper surface to top plate 26 and has its downwardly directed channel or cavity adapted to receive the upper end of column 21e. The upper end of column 21e is rounded to correspond to the surface of a sphere and is received in a correspondingly shaped area in the upper part of the beam channel. The lower end of column 21e is also rounded to conform to the surface of a sphere and is supported in a cavity in base element 31. A cup-like bottom cover portion 37 is provided which conforms to the rounded cavity in base 31 and extends upward through bottom plate 27 which is provided with an opening for this purpose. A disc 34 is fastened to bottom plate 27 by means of screws such as 33a and 33b. Disc 34 contains a central opening. The openings in disc 34 and bottom plate 27 are sufficiently large to allow free vertical movement of the disc and bottom plate without contact with the bottom cover portion 37.

The lower end portion of a bellows 36 is sealed with respect to disc 34 at its central opening and the upper end portion of the bellows is sealed with respect to the upper rim of cover portion 37. Cover portion 37, bellows 36 and frame portion 28' cooperate in protecting column 21e from dust, dirt or other foreign matter which might interfere with the proper operation of the weighing apparatus, and yet the assembly is such that the weighing cell parts may be readily separated for inspection, repair or replacement.

The strains induced in column 21e by weight applied to platform 13a are measured by means of electrical resistance type strain gages such as 38. One or more of these gages may be used on each weighing column as desired. The total of the strains effected in the weighing columns may be suitably measured by electrical resistance measuring instrumentation of well known types, such as arrangements of the type described in U.S. patent to Thurston No. 2,488,349.

Figs. 6 and 7 show in greater detail the means used to connect the weighing assemblies to the center section 12. This center section, like the weighing platforms, is preferably of sandwich-like construction in order to conserve weight. As shown in Figs. 6 and 7, the center section comprises a top plate 38, a bottom plate 39, a frame 41 and an interior section which is preferably of honey-comb construction similar to that used in platform 13a as described above. Lug 18d is secured to frame 41 by suitable means, such as welding, and is provided with a hole adapted to receive a pin 42 carried by a lug 43 attached to frame 19d of weighing assembly 11d. Pin 42 may be an integral part of lug 43 or may be fastened thereto by means of bolts such as 44. In the latter event pin 42 preferably includes a flange 46 as an integral part thereof. By means of this type of connection, it is possible to effectively secure the weighing assemblies to the center section in the shortest possible amount of time.

While the invention has been described in detail with respect to a preferred embodiment, it will be understood by those skilled in the art that various changes and modifications may be made without departing from the spirit and scope of the invention and it is intended to cover all such changes and modifications in the appended claims.

What is claimed is:

1. In a platform weighing assembly, the combination comprising: supporting base means; a platform structure of shallow depth in a position closed spaced with respect to and above said supporting base means; a plurality of weighing cell assemblies located at spaced positions and adapted to support said structure with respect to said base means and to weigh loads applied to the structure, said structure including closely spaced upper and lower plates connected by strengthening means therebetween including a beam with downwardly directed cavities, said weighing cell assemblies each including a column located at least partly in one of said cavities and positioned to support such beam with respect to the base; strain gauge means mounted on said column; and closure means containing said column means and the gauge means thereon and serving to close the space containing same in such cavity said closure means being readily flexible in vertical directions and relatively rigid in horizontal directions for securing the said structure to the base means and against generally horizontal movements with respect to the base means.

2. In a platform weighing assembly, the combination comprising: supporting base means; a platform structure of shallow depth in a position closely spaced with respect to and above said supporting base means; a plurality of weighing cell assemblies located at spaced positions and adapted to support said structure from the base means and to weigh loads applied to the structure, said structure including a top platform member connected to strengthening means thereunder including beam means, said weighing cell assemblies each including a column located at least partly within the depth of said structure and positioned to support such beam means with respect to the base; strain gauge means mounted on said column; and a disc-like member of imperforate flexible sheet material located within the area defined by said weighing cell assemblies and disposed generally flatwise between the base means and said structure and affixed to the latter means and structure at spaced locations respectively.

3. Portable weighing apparatus for weighing vehicles and the like having tandem axles, comprising in combination: a central spacer platform assembly of shallow depth adapted to be placed to extend transversely across the path of a vehicle; four weighing platform assemblies of shallow depth adapted to be placed in positions to receive the weight of four wheels respectively for the tandem axles of the vehicle; and means for detachably connecting edges of two of said weighing platform assemblies to one side of said central spacer assembly and edges of the two other weighing platform assemblies to the opposite side edge of the central spacer assembly, each of said weighing platform assemblies comprising base means, a platform structure superposed thereover and a plurality of spaced-apart weighing cells interposed between such structure and base means and acting to support the structure, and each of said cells including electrical strain gauge means for giving indications of the weight supported on said structure.

4. Portable weighing apparatus for weighing vehicles and the like having tandem axles, comprising in combination: a central spacer platform assembly of shallow depth adapted to be placed to extend transversely across the path of a vehicle; four weighing platform assemblies of shallow depth adapted to be placed in positions to receive the weight of four wheels respectively for the tandem axles of the vehcile; and means for detachably connecting edges of two of said weighing platform assemblies to one side of said central spacer assembly and edges of the two other weighing platform assemblies to the opposite side edge of the central spacer assembly, each of said weighing platform assemblies comprising base means, a platform structure superposed thereover and a plurality of spaced-apart weighing cells interposed between such structure and base means and acting to support the structure, each of said cells including electrical strain gauge means for giving indications of the weight supported on said structure; and ramp means associated with the base means of each weighing platform assembly, one of said ramp means being located adjacent the edge of each weighing assembly opposite the edge thereof which is detachably connected to the spacer assembly.

5. Portable weighing apparatus for weighing vehicles and the like, comprising in combination: a connecting platform assembly of shallow depth adapted to be placed to extend transversely across the path of a vehicle; two weighing platform assemblies of shallow depth adapted to be placed in positions to receive the weight of two wheels respectively for an axle of the vehicle; and means for detachably connecting edges of said weighing platform assemblies to one side of said connecting assembly, each of said weighing platform assemblies comprising base means, a platform structure superposed thereover and a plurality of spaced-apart weighing cells interposed between such structure and base means and acting to support the structure, and each of said cells including electrical strain gauge means for giving indications of the weight supported on said structure.

6. Weighing apparatus in accordance with the foregoing claim 5 and in which said detachable connecting means comprises pins and cooperating apertured lugs providing for hooked-like interconnection of the assemblies.

7. In portable weighing apparatus adapted to be placed on a highway or the like for weighing vehicles, a weighing assembly of shallow depth comprising: base means and ramp means associated therewith; a platform structure superposed over said base means; and a plurality of spaced-apart weighing cells interposed between such structure and base means and adapted to support and weigh the structure and loads carried thereby, said structure including upper and lower plate areas connected by strengthening means therebetween including beam portions bearing against said cells, honeycomb stiffening means between the plates, and means interconnecting said structure and base means for preventing horizontal movement therebetween, said latter means being readily yieldable vertically and non-yielding in horizontal directions.

8. Weighing cell apparatus adapted for use as part of a weighing platform assembly of shallow depth, comprising in combination: a base element having an upwardly directed depression shaped to conform to a sphere; a cup-shaped closure portion of sheet material having its lower portion substantially fitting said depression; a column therein having upper and lower ends shaped to conform to a sphere, the lower end of the column engaging the inside of the lower portion of said cup closure portion; a weight-supporting platform structure including a beam portion with a downwardly directed channel or cavity within which said column and cup-shaped portion are at least partially received, the cavity in said beam portion including an area adapted to engage the upper end of the column; bellows means surrounding the cup-shaped portion and sealed with respect to the rim thereof and with respect to said structure; and strain gauge means mounted on said column.

9. Weighing cell apparatus adapted for use as part of a weighing platform assembly of shallow depth, comprising in combination: a beam portion for forming a part of the assembly and having a downwardly directed channel; a base element below said channel; column means engaging in said channel at its upper end and supported by said element at its lower end; strain gauge means mounted on said column means; and closure means for the space occupied by said column means in said channel, comprising cup-like means for receiving the lower end of the column means as supported by said base element, and readily flexible means surrounding said cup-like means and sealed with respect to the rim of the latter and with respect to the flanges of the channel of the beam portion.

References Cited in the file of this patent

UNITED STATES PATENTS

| | | | |
|---|---|---|---|
| 1,527,769 | Ashbrook et al. | Feb. 24, 1925 |
| 2,264,909 | Kelly | Dec. 2, 1941 |
| 2,488,349 | Thurston | Nov. 15, 1949 |
| 2,561,318 | Ruge | July 17, 1951 |
| 2,673,082 | Thurston | Mar. 23, 1954 |
| 2,746,738 | Reiser | May 22, 1956 |
| 2,775,887 | Hines | Jan. 1, 1957 |
| 2,793,850 | Eckman | May 28, 1957 |
| 2,793,851 | Ruge | May 28, 1957 |
| 2,794,889 | Bachman et al. | June 4, 1957 |
| 2,882,036 | Lyons | Apr. 14, 1959 |

FOREIGN PATENTS

| | | |
|---|---|---|
| 259,553 | Italy | June 19, 1928 |
| 733,487 | Germany | Mar. 27, 1943 |
| 753,837 | Great Britain | Aug. 1, 1956 |